United States Patent
Ribas-Corbera et al.

(10) Patent No.: US 6,560,370 B2
(45) Date of Patent: *May 6, 2003

(54) METHOD AND APPARATUS FOR SELECTING IMAGE DATA TO SKIP WHEN ENCODING DIGITAL VIDEO

(75) Inventors: Jordi Ribas-Corbera, Vancouver, WA (US); Shaw-Min Lei, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/066,369

(22) Filed: Jan. 30, 2002

(65) Prior Publication Data

US 2002/0122598 A1 Sep. 5, 2002

Related U.S. Application Data

(62) Division of application No. 09/502,166, filed on Feb. 11, 2000, and a division of application No. 09/502,167, filed on Feb. 11, 2000, which is a division of application No. 09/052,882, filed on Mar. 31, 1998, now abandoned.

(51) Int. Cl.$^7$ .................................................. G06K 9/46
(52) U.S. Cl. ...................................................... 382/239
(58) Field of Search ................................ 382/239, 100, 382/199, 242, 243, 232, 234, 235, 236, 244, 248, 251, 252, 253; 375/240.11, 240.19, 240.16, 240.03, 240.05; 714/701, 752

(56) References Cited

U.S. PATENT DOCUMENTS 4,302,775 A * 11/1981 Widergren et al. ......... 358/136
4,999,074 A    3/1991 Afeyan
5,099,322 A    3/1992 Gove (List continued on next page.)

OTHER PUBLICATIONS

U.S. patent application Ser. No. 60/052,487, Ito, filed Apr. 2000.
*Early Detection of All–Zero Coefficients in H. 263* by Alice Yu, Ruby Lee, and Michael Flynn, Computer Systems Laboratory, pp. 159–163.
*Rate Shaping by Block Dropping for Transmission of MPEG–precoded Video over Channels of Dynamic Bandwidth* by Wenjun Zeng and Bede Liu, Dept. of Electrical Engineering Princeton University, pp. 385–393.
*Constrained and General Dynamic Rate Shaping of Compressed Digital Video* by Alexandros Elefheriadis and Dimitrus Anastsassiou, Dept. of Engineering and Center for Telecommunications Research Columbia University, pp. 396–399 (0–8186–7310–9/95 1995 IEEE).
*Methods for Matching Compressed Video to ATM Networks* by Robert J. Safranek, Charles R. Kalmanek Jr., and Rahul Garg, AT&T Bell Laboratories, pp. 13–16 (0–8186–7310–9/95 1995 IEEE).

Primary Examiner—Jayanti K. Patel
Assistant Examiner—Seyed Azarian
(74) Attorney, Agent, or Firm—Marger Johnson & McCollom, P.C.

(57) ABSTRACT

Block and frame skipping decides which image regions, blocks or frames in a video frame or series of frames should be encoded. Block skipping detects in advance which of the blocks in a video frame will produce little or no bits, so that the encoder can skip the encoding process for these blocks. Block skipping uses an iterative procedure to determine the optimal energy threshold value for each image frame. All the image blocks whose pixel energy is below the optimal threshold for the frame are skipped. Frame skipping predicts a distortion or image quality value for each frame. If some frames have a predicted image quality smaller than a preset value, these frames are allocated more bits and if, as a result, too few bits are left for future frames, the latter frames are skipped. This selective frame skipping guarantees that the quality of the non-skipped frames is above the preset value.

28 Claims, 8 Drawing Sheets

U.S. PATENT DOCUMENTS

| | | | |
|---|---|---|---|
| 5,103,307 A | | 4/1992 | Sugiyama |
| 5,159,447 A | | 10/1992 | Haskell et al. |
| 5,241,383 A | | 8/1993 | Chen et al. |
| 5,267,334 A | * | 11/1993 | Normalli et al. ............ 382/236 |
| 5,274,443 A | | 12/1993 | Dachiku et al. |
| 5,283,646 A | | 2/1994 | Bruder |
| 5,323,187 A | | 6/1994 | Park |
| 5,426,463 A | | 6/1995 | Reininger et al. |
| 5,532,746 A | | 7/1996 | Chang |
| 5,613,004 A | * | 3/1997 | Cooperman et al. .......... 380/28 |
| 5,617,150 A | | 4/1997 | Nam et al. |
| 5,742,707 A | * | 4/1998 | Pan et al. ................... 382/232 |
| 5,818,970 A | * | 10/1998 | Ishikawa et al. ............ 382/248 |
| 5,822,465 A | * | 10/1998 | Normalli et al. ............ 382/253 |
| 5,832,115 A | * | 11/1998 | Rosenberg ................. 382/199 |
| 5,862,260 A | * | 1/1999 | Rhoads ....................... 382/232 |
| 5,903,676 A | * | 5/1999 | Wu et al. .................... 382/244 |
| 5,966,465 A | * | 10/1999 | Keith et al. ................. 382/232 |
| 5,974,380 A | * | 10/1999 | Smyth et al. ............... 704/229 |
| 5,986,711 A | * | 11/1999 | Pau ............................ 348/408 |
| 6,052,487 A | * | 4/2000 | Ito .............................. 382/239 |
| 6,332,030 B1 | * | 12/2001 | Manjunath et al. ......... 382/100 |
| 6,359,928 B1 | * | 3/2002 | Wang et al. ............ 375/240.05 |

\* cited by examiner

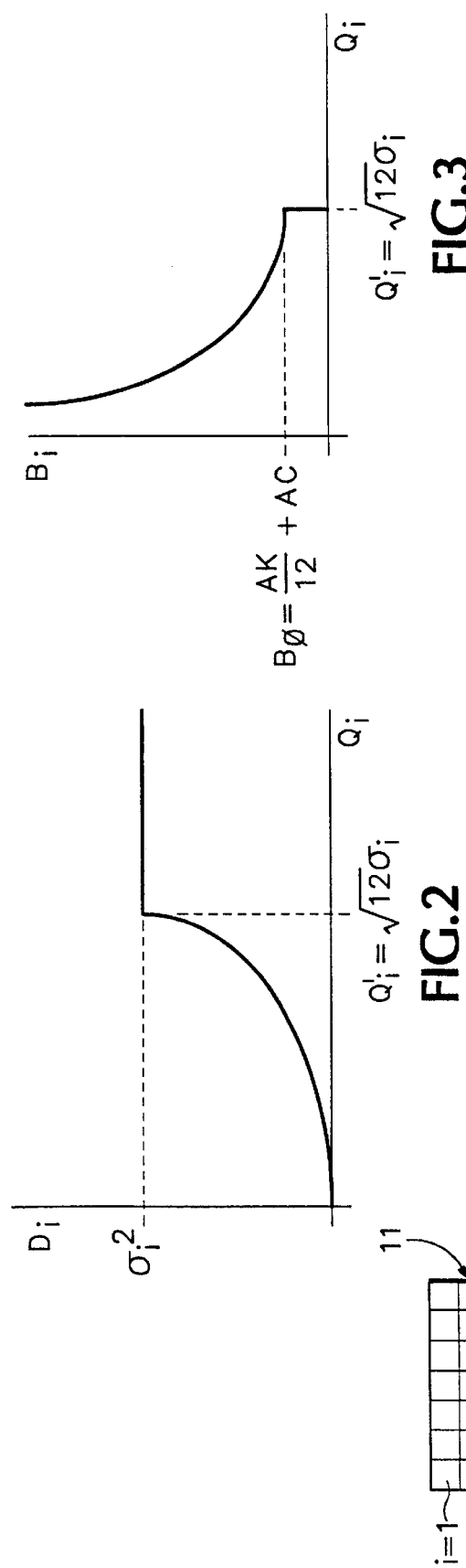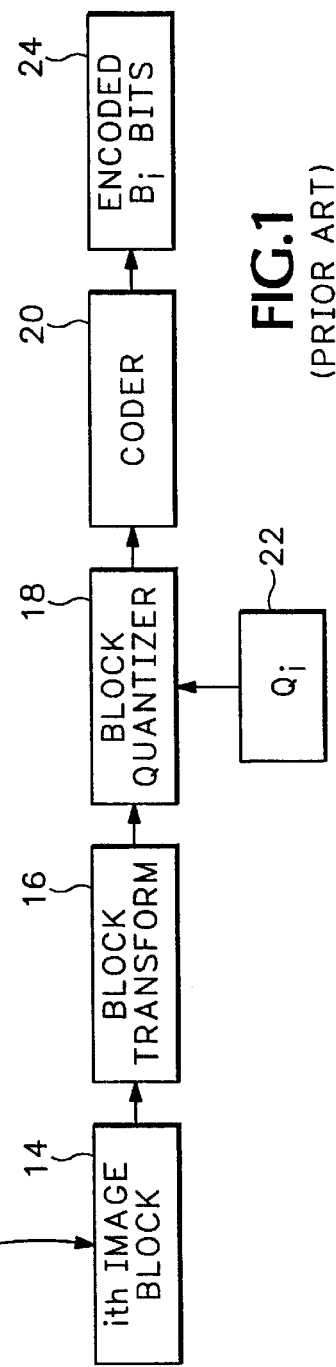
FIG. 2
FIG. 3
FIG. 1 (PRIOR ART)

BLOCKS WITH "X" ARE SKIPPED

| VIDEO SEQUENCE | FORMAT | FRAME RATE (fps) | BIT RATE (Kbps) | INCREASE IN QUALITY Y(dB) | INCREASE IN QUALITY V(dB) | SAVINGS IN COMPUTATION |
|---|---|---|---|---|---|---|
| "COASTGUARD" | CIF | 15 | 112 | +3.44 | +0.91 | 75% |
| "CONTAINER" | QCIF | 7.5 | 10 | +0.8 | +0 | 80% |
| "CONTAINER" | QCIF | 10 | 24 | +0.8 | +0.45 | 50% |
| "HALL" | QCIF | 7.5 | 10 | +1.26 | +0.24 | 80% |
| "MOTHER" | QCIF | 7.5 | 10 | +0.62 | +0.61 | 90% |
| "NEWS" | CIF | 15 | 112 | +0.67 | +1.38 | 65% |
| "NEWS" | CIF | 7.5 | 48 | +1.24 | +3.06 | 75% |

FIG.11

METHOD AND APPARATUS FOR SELECTING IMAGE DATA TO SKIP WHEN ENCODING DIGITAL VIDEO

This application is a divisional of prior application Ser. No. 09/502,166, filed Feb. 11, 2000 and Ser. No. 09/502,167, filed Feb. 11, 2000, which are divisionals of prior application Ser. No. 09/052,882, filed Mar. 31, 1998, now abandoned.

BACKGROUND OF THE INVENTION

The invention relates to encoding digital images and video in low bit rate and low delay communication environments and more specifically to selecting which video frames and image regions should be skipped before encoding the digital images and video.

In low bit rate and low delay video communications, such as in a video phone, video conferencing, broadcast, etc., a large percentage of the video data cannot be encoded and transmitted to the receiver. In fact, entire video frames or large regions of pixels within a frame must often be skipped (not encoded) when the bit rate of the communication is too low or when the encoder buffer is approaching overflow. If the data to be skipped is not selected intelligently, the quality of the encoded video decreases dramatically.

Some compression techniques do not determine before hand that blocks are going to be skipped and as a result waste computation resources. At very low bit rates, the compression is so high that over 90 per cent of the blocks may not produce any bits. Hence, these types of encoders waste time and computational resources by unnecessarily processing blocks that do not produce bits by the encoder. This waste is fairly dramatic in advanced video codecs, since block encoding usually requires complex transformation of the pixel values typically using a Discrete Cosine Transform (DCT) and some quantization of the transform coefficients.

Rate control methods generally use the energy of the pixels in a frame to determine bit allocations. The energy of the blocks that do not produce bits is also considered in the bit allocation. This procedure is not effective in intelligently distributing the bits throughout the frame and adversely affects the quality of the encoded image.

A system incorporating block skipping is described by A. Yu, R. Lee, and M. Flynn, "Early detection of all-zero coefficients in H.263", in Proceedings of the Picture Coding Symposium, pp. 159–164, Berlin, September 1997. In Yu, Lee, and Flynn, image blocks having DC coefficients below a threshold are skipped. This approach is simple to implement but skips important blocks that have high energy frequency components and a small DC value.

Another block skipping approach is described by A. Eleftheriadis and D. Anastassiou, "Constrained and general dynamic rate shaping of compressed digital video," in Proceedings of the International Conference on Image Processing, vol. 3, pp. 396–399, October 1995 and by R. J. Safranek, C. R. Kalmanek Jr., and R. Garg, "Methods for matching compressed video to ATM networks," in Proceedings of the International Conference on Image Processing, vol. 1, pp. 13–16, October 1995. This block skipping technique first encodes the image blocks and then drops encoded image blocks from the encoded bit stream to hit a target bit rate. The problem with this method is that all the blocks need to be encoded in advance and organized in order of importance. This technique defeats the purpose of saving computational complexity at the encoder.

In video communications, the encoding bits are usually stored in a buffer before they are transmitted through the channel. If there is high motion activity or a scene change, the video frames occupy many bits and the buffer fills up quickly. When the buffer is close to overflow, the encoder must produce fewer bits and even skip coding frames. Typically, during high motion and scene changes, one or several frames are skipped and the remaining, non-skipped frames are encoded with low image quality.

A smart encoder should decide when and how many frames should be skipped, so that enough bits are left for encoding the non-skipped frames with good quality. Forcing the encoder to operate on a smaller range of quantization values can prevent the drop in image quality in the non-skipped frames during high motion and scene changes. However, the number of bits produced per frame can not be controlled using this technique and presents the serious danger of buffer overflow. Some recent encoding techniques detect scene changes using ad hoc mechanisms and improve the image quality during the changes, but these methods are not robust and the video quality still drops occasionally. For example, U.S. Pat. No. 4,999,704 issued Mar. 12, 1991 to Ando entitled "System for efficiently coding a moving-picture signal, capable of selecting several different coding systems," and U.S. Pat. No. 5,099,322 issued March 24, 1994 to R. J. Gove, entitled "Scene change detection system and method" use simple frame difference and threshold-based mechanisms to detect the scene changes. The thresholds in these techniques are heuristically determined and easily fail.

Thus, a need remains for intelligently deciding which blocks in a video frame and which video frames should be skipped, when there is a limited number of available bits.

SUMMARY OF THE INVENTION

A block and frame skipping technique decides which image regions, blocks or frames in a video frame or series of frames should be skipped. Many of the blocks in a given video frame are very similar to blocks in previous frames and after motion compensation the pixel energy remaining in the blocks is very small. As a result, either few or no bits are generated when encoding these low energy blocks. Block skipping detects in advance which of the regions in a video frame will not produce any bits, so that the encoder can skip the encoding process for these blocks.

The energy threshold is dynamically adapted for every image frame according to the energy in the frame, a number of bits available for encoding the frame and the efficiency of the encoder. The block skipping technique uses an iterative procedure to determine the optimal energy threshold. Block skipping repeatedly discards the image block with the lowest energy and then recomputes the energy threshold. The process is repeated until the energy threshold is less than that of the block with lowest energy among the remaining nondiscarded blocks. The threshold at this point is referred to as the optimal energy threshold. All image blocks whose pixel energy is below the optimal energy threshold are skipped.

Frame skipping predicts the distortion quality of an entire frame before encoding. If the predicted frame quality is below a distortion threshold, more bits are assigned to that frame while other frames are skipped.

Block skipping and frame skipping provide more efficient bit rate control by not allocating bits to blocks or frames that should not be encoded. Block and frame skipping reduce up to 90 percent of the computational complexity of the DCT/quantization procedure at the encoder.

Another benefit of the invention from previous decoding techniques is that the quality of the encoded video is guaranteed not to drop below a minimum pixel signal to noise ratio (PSNR), even throughout scene changes and high-motion video frames. The number of bits produced per frame is well controlled and hence there is no danger of buffer overflow. Sophisticated scene change detectors or other complexity indicators are not required providing a computationally simple encoding technique. A typical block-based image coder is used to explain the invention. However, the block and frame skipping technique can be used for any image or video encoder.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

FIG. 1 is a block diagram of a prior art encoder.

FIG. 2 is a graph showing distortion for an image block.

FIG. 3 is a graph showing bits produced for the image block with block skipping.

FIG. 11 is a table showing the results of block skipping.

DETAILED DESCRIPTION

Figure 4:
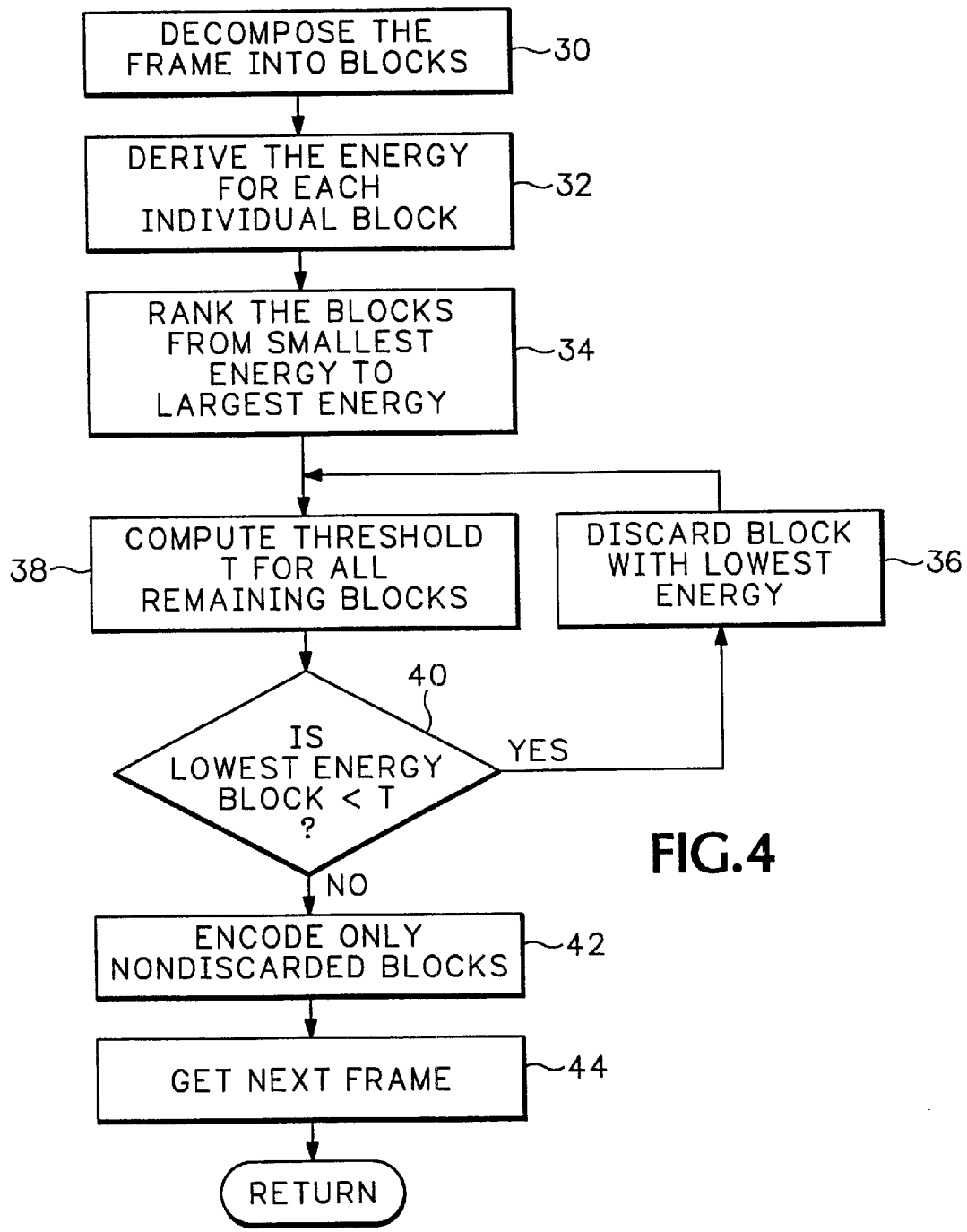
FIG. 4 is a step diagram showing how block skipping is performed according to one aspect of the invention.

Referring to FIG. 1, a prior art encoder 12 encodes an ith block 14 of an image frame 11. In block-based image coding, the image frame 11 to be encoded is decomposed into multiple image blocks 14 of the same size, typically of 16×16 pixels per block 14. The pixel values of the block 14 are transformed in transform 16 into a set of coefficients, for example using a Discrete Cosine Transform (DCT). The coefficients output from transform 16 are quantized in quantizer 18 according to a set of quantization values 22 and further encoded in coder 20.

The quantization of the transformed coefficients in block 18 is a key procedure since it determines the distortion quality with which the image block 14 will be encoded. The quantization of the ith block 14 is controlled by only one parameter, $Q_i$ from quantizer values 22. In the H.261 and H.263 video coding standards, $Q_i$ is known as the quantization step for the ith block 14 and its value corresponds to half the step size used for quantizing the transformed coefficients.

The affect of the quantization steps $Q_i$ on the distortion in the coded image is modeled below. High distortion indicates low image quality and vice versa. For the distortion in the i-th image block 14, $D_i$ is the mean squared error (MSE) between the pixel values in the i-th original block 14 and those in the previously encoded version of the block output as encoded bit stream 24 from coder 20. The distortion $D_i$ increases with coarser quantization, i.e., larger $Q_i$. The following approximate expression is derived for $D_i$:

$$D_i = \begin{cases} \frac{Q_i^2}{12}; & Q_i \leq Q_i' = \sqrt{12}\sigma_i \\ \sigma_i^2; & \text{otherwise} \end{cases} = \min\left(\frac{Q_i^2}{12}, \sigma_i^2\right), \quad (1)$$

that is shown in FIG. 2. The distortion $D_i$ increases with the square of $Q_i$ up to a saturation point, $Q_i'=\sqrt{12}\sigma_i$, which is when $D_i$ reaches the value of the block's pixel variance $\sigma_i^2$. When the quantizer step $Q_i$ is larger than $Q_i'$, the block's distortion will be the same, even if the block is not encoded.

Averaging the encoding distortion for the N blocks 14 in the image 11, the overall distortion is obtained:

$$D = \frac{1}{N}\sum_{i=1}^{N} D_i = \frac{1}{N}\sum_{i=1}^{N} \min\left(\frac{Q_i^2}{12}, \sigma_i^2\right) \quad (2)$$

At high bit rates, the $Q_i$'s are small enough that $Q_i<Q_i'$ for all i, and hence equation (2) can be simplified to:

$$D = \frac{1}{N}\sum_{i=1}^{N} \frac{Q_i^2}{12}. \quad (3)$$

The simpler distortion model in equation (3) is not correct at very low bit rates since $Q_i$ is often larger than $Q_i'$ for some blocks. Unfortunately, the model in equation (2) makes the mathematical optimizations very difficult because of the minimization operators. Thus, equation (3) is often used even for low bit rate applications. Equation (3) is used to model distortion for quantization schemes such as described in co-pending patent application Ser. No. 09/008,137 filed Jan. 16, 1998 entitled "Method and Apparatus for Optimizing Quantizer Values in an Image Encoder", that is herein incorporated by reference. In the co-pending application, the complete distortion model in equation (2) is incorporated into the rate-distortion optimization model and is the basis of the block and frame skipping according to the invention.

Intuitively, the number of bits $B_i$ needed to encode the image blocks 14 increases with finer quantization (smaller $Q_i$). This relationship is modeled with the following equation:

$$B_i = A\left(K\frac{\sigma_i^2}{Q_i^2} + C\right), \quad (4)$$

where, $B_i$ is proportional to the inverse of the squared quantizer step size $Q_i$. A is the number of pixels in a block (e.g., in MPEG and H.263, A=$16^2$ pixels), K and C are model parameters that are estimated during encoding, and $\sigma_i$ is the empirical standard deviation of the pixels in the block, $$\sigma_i = \sqrt{\frac{1}{A}\sum_{j=1}^{A}(P_i(j) - \overline{P}_i)^2}, \quad (5)$$

where $P_i(j)$ is the value of the jth pixel in the ith block 14 and $\overline{P}_i$ is the average of the pixel values in the block 14, $$\overline{P}_i = \frac{1}{A} \sum_{j=1}^{A} P_i(j). \tag{6}$$

For color images, the $P_i(j)$'s are the values of the luminance and chrominance components at the respective pixels. The model in equation (4) was derived using a rate-distortion analysis of the block's encoder shown in FIG. 1 and is the same used in the co-pending application Ser. No. 09/008,137.

N is the number of image blocks 14 in the image frame 11 (FIG. 1). Using equation (4), bits are added for all the blocks and obtain the following expression for the total number of bits B:

$$B = B_1 + B_2 + B_3 + \ldots + B_N = \sum_{i=1}^{N} B_i = \sum_{i=1}^{N} A\left(K\frac{\sigma_i^2}{Q_i^2} + C\right) \tag{7}$$

where B depends on the quantization parameters selected, $Q_1, Q_2, \ldots, Q_N$, the energies or variances of the blocks, $\sigma_1^2, \sigma_2^2, \ldots, \sigma_N^2$, the block size A (in pixels), and the model parameters K and C.

Modified Encoder Model for Block Skipping

As mentioned above, when one of the blocks 14 is quantized with a step size $Q_i$ larger than $Q_i' = \sqrt{12}\sigma_i$, the distortion remains the same, even if the block is not encoded. The smart rate control technique used in the present invention takes advantage of this property and skips blocks whenever $Q_i \geq \sqrt{12}\sigma_i$. In that case, the model in equation (4) for the number of bits produced should be modified as follows:

$$B_i = \begin{cases} A\left(K\frac{\sigma_i^2}{Q_i^2} + C\right), & Q_i < \sqrt{12}\sigma_i \\ 0, & Q_i \geq \sqrt{12}\sigma_i \end{cases} \tag{8}$$

$$= A\left(K\frac{\sigma_i^2}{Q_i^2} + C\right)H(Q_i - \sqrt{12}\sigma_i),$$

where $H(Q_i - \sqrt{12}\sigma_i)$ is a step function which is equal to 1 when $Q_i < \sqrt{12}\sigma_i$ and 0 otherwise. The form of $B_i$ is shown in FIG. 3. Finally, the total number of bits for the frame is:

$$B = B_1 + B_2 + B_3 + \ldots + B_N \tag{9}$$

$$= \sum_{i=1}^{N} B_i$$

$$= \sum_{i=1}^{N} A\left(K\frac{\sigma_i^2}{Q_i^2} + C\right)H(Q_i - \sqrt{12}\sigma_i).$$

In rate control, the objective is to spend a pre-selected number of bits B into N image blocks, so that the image distortion is as small as possible (i.e., the image quality is as high as possible). Mathematically, this is equivalent to minimizing the distortion D in equation (2) subject to the constraint that the total number of bits must be equal to B in equation (9):

$$\tilde{D} = \min_{Q_1, \ldots, Q_N} \tag{10}$$

$$D = \min_{Q_1, \ldots, Q_N} \frac{1}{N} \sum_{i=1}^{N} \min\left(\frac{Q_i^2}{12}, \sigma_i^2\right),$$

$$B = \sum_{i=1}^{N} A\left(K\frac{\sigma_i^2}{Q_i^2} + C\right)H(Q_i - \sqrt{12}\sigma_i).$$

The minimization in equation (10) is very difficult to solve mathematically because D is not convex or differentiable. The optimal $Q_i$'s are determined using a numerical optimization, but such techniques are complex since the number of variables to optimize, N, is usually very large. Alternatively, equation (10) is transformed into an approximate, simpler optimization problem.

Observe that if a set of values $\hat{Q}_1, \hat{Q}_2, \hat{Q}_N$, minimize the distortion D and some $\hat{Q}_i$ is larger than $Q_i'$, the values are set as $\hat{Q}_i = Q_i'$ without increasing the distortion. This is because D does not increase if some $Q_i$ are larger than $Q_i'$ (recall FIG. 2). Therefore, consider the following minimization:

$$D' = \min_{Q_1, \ldots, Q_N} \frac{1}{N} \sum_{i=1}^{N}$$

$$D_i = \min_{Q_1, \ldots, Q_N} \frac{1}{N} \sum_{i=1}^{N} \frac{Q_i^2}{12},$$

subject to $$B = \sum_{i=1}^{N} A\left(K\frac{\sigma_i^2}{Q_i^2} + C\right) \tag{11}$$

and $$\{Q_i \leq \sqrt{12}\sigma_i : i = 1, \ldots, N\}.$$

The solution of the minimization in equation (11) is very close to that in equation (10). Specifically, it is shown that $\tilde{D} = D'$ when $B_0 = AK/12 + AC = 0$. $B_0$ is the minimum number of bits produced if a block is encoded (as shown in FIG. 3) and is not zero, but is typically very small. Focusing on finding a solution for equation (11), the relationship in equation (4) is used between $B_i$ and $Q_i$ to state the minimization as a function of the $B_i$'s, the number of bits allocated to the blocks:

$$D' = \min_{\substack{B_1, \ldots, B_N: \\ B_i \geq B_0; B = \sum_{i=1}^{N} B_i}} \frac{1}{N} \sum_{i=1}^{N} D_i(B_i) = \frac{1}{N} \sum_{i=1}^{N} \frac{AK}{12} \frac{\sigma_i^2}{B_i}. \tag{12}$$

The formula for distortion in equation (12) is convex and is minimized over a convex set. Hence, there exist a unique set of values $B_1^*, \ldots, B_N^*$ that achieves the minimum. Furthermore, the Kuhn-Tucker theory indicates there exist some value L such that:

$$\frac{dD_i(B_i^*)}{dB_i} = L \quad \text{when } B_i^* > B_0 \tag{13}$$

-continued $$\frac{dD_i(B_i^*)}{dB_i} \geq L \text{ when } B_i^* = B_0 \approx 0$$

Using equation (13) and re-labeling the block variances (without loss of generality) so that $\sigma_1 \leq \sigma_2 \leq \ldots \leq \sigma_N$ is it shown that there exist some value M such that:

$$B_i^* = B_0 \approx 0, i=1,2,\ldots,M$$

$$B_i^* > B_0 \approx 0, i=M+1,M+2,\ldots,N \quad (14)$$

The conclusion in equation (14) is key to block skipping and indicates that, in order to minimize the MSE distortion, the M image blocks with smallest variance should have approximately zero bits, i.e., they should not be encoded.

The last step is to find the M blocks that need to be skipped. At this time, it is only known that blocks to be skipped have lower block energy than those blocks that will eventually be encoded. An expression for the value of L in equation (13) is obtained in equation (15).

$$L = -\frac{1}{12} \frac{AK}{(B - MB_0)^2} \left( \sum_{k=M+1}^{N} \sigma_k \right)^2. \quad (15)$$

Block and Frame Skipping

Combining equation (15) and equation (13), the following constraint is derived for the standard deviations of the M blocks that can be skipped:

$$\sigma_i \leq T = \frac{1}{12} \frac{AK}{B - MB_0} \sum_{k=M+1}^{N} \sigma_k, \text{ for } i = 1, 2, \ldots, M \quad (16)$$

Equation (16) is the key for block skipping. The procedure determines the value of the threshold T before encoding the image blocks. All the blocks whose energy (in terms of standard deviation) is below T are skipped.

However, the value of T cannot be derived directly from equation (16), because T is a function of M, the number of blocks skipped. Hence T is needed to find the number of blocks to skip, M, and M is needed to find T. Using an iterative block skipping procedure as follows solves this conflict:

1. Let m=1.
2. Compute the value of equation T in equation (16) assuming that M=m−1.
3. If $\sigma_{M+1}$<T, then M must be larger. Set m=m+1 and go back to 1.
   Otherwise, the right values of T and M are found (stop).

Two methods are described below that implement this three-step procedure. One of the methods is essentially the same as described above. The procedure above assumes that the image blocks 14 have been ordered according to their standard deviation. The second procedure avoids the computational complexity associated with ordering the blocks by using a histogram of the standard deviations.

If M blocks with energy lower than the threshold T are skipped, the following formula is used to predict the optimal MSE distortion D' for encoding the frame:

$$D' = \frac{1}{N} \sum_{\sigma_i \leq T} \sigma_i^2 + \frac{AK}{12N(B - ANC)} \left( \sum_{\sigma_i > T} \sigma_i \right)^2, \quad (17)$$

which is derived from minimizing equation (12). The formula for distortion in equation (17) is used to predict the value of the distortion with which a frame will be encoded. D' can be expressed in pixel signal to noise ratio (PSNR) units as follows:

$$D'_{PSNR} = 10 \log \frac{255^2}{D} \quad (18)$$

If $D_{PSNR}$ is smaller than some minimum PSNR quality (set by the user), the number of bits B is increased for the current frame and future frames are skipped accordingly.

Figure 5:
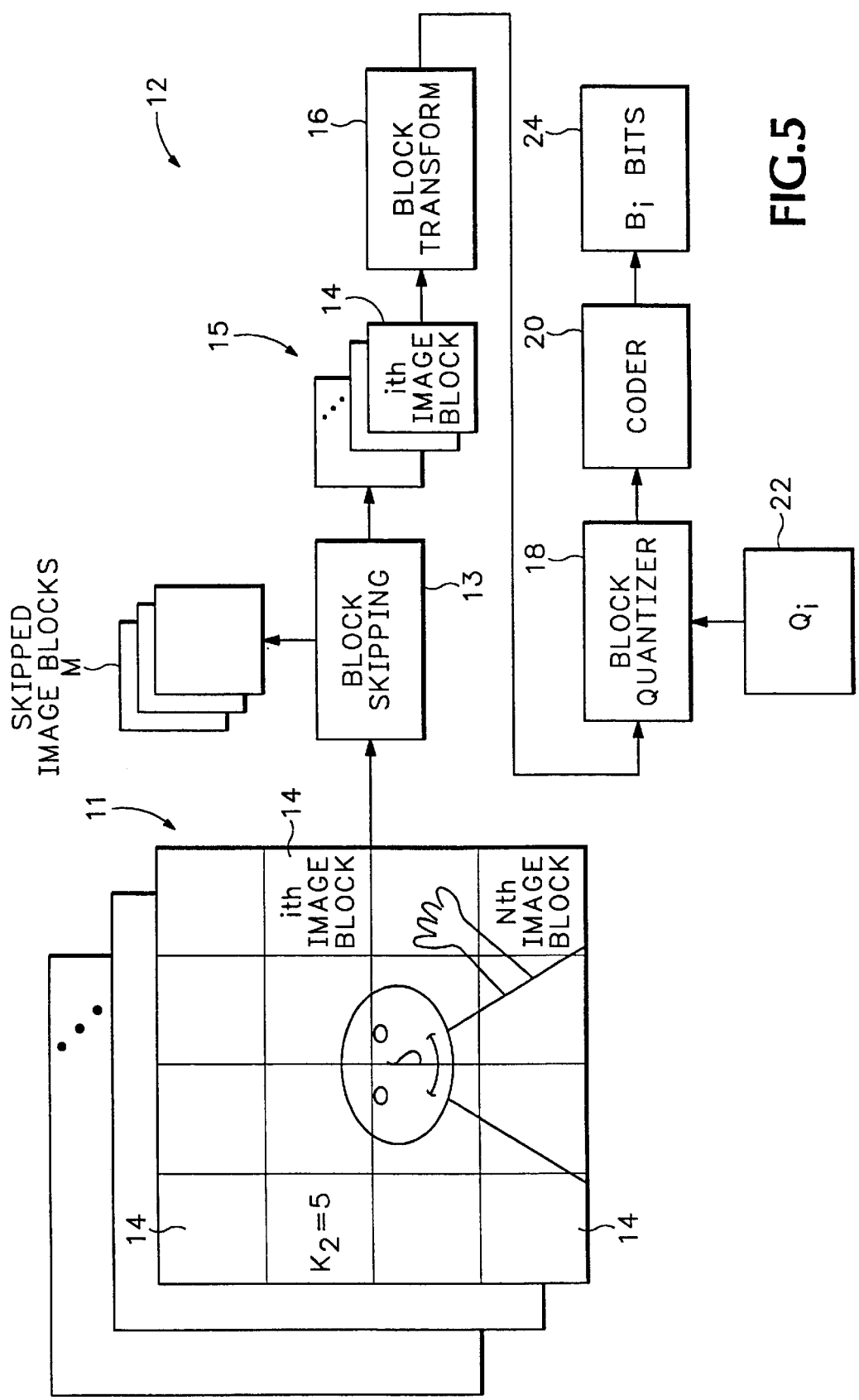
FIG. 5 is a block diagram showing how block skipping is incorporated into the encoder shown in FIG. 1.

FIGS. 4 and 5 show how block skipping is performed according to the invention. FIG. 5 shows block skipping 13 included in the encoder 12 previously described in FIG. 1. A step diagram in FIG. 4 describes the operations performed by the block skipping function 13.

Step 1: Initialization

A frame 11 is decomposed into N blocks 14 of a fixed size, e.g., 16×16 pixels per block in step 30. The standard deviations $\sigma_1, \sigma_2, \ldots, \sigma_N$ of the pixels (energy) in the blocks 14 are derived in step 32 using the formula in equation (3). The standard deviations are ordered (ranked) according to energy values in step 34. Let $\sigma_{m_1}, \sigma_{m_2}, \ldots, \sigma_{m_N}$ be the ordered standard deviations of the blocks 14, where $m_i$ corresponds to the index of the block with the $m_i$-th smallest standard deviation. For example, $m_2=5$ means that the 5-th image block (in a raster-scan order) has the second smallest standard deviation. At the beginning, no block is discarded and we set j=1. An initial block-skipping threshold is computed for all the blocks in step 38 according to the following equation:

$$T = \frac{1}{12} \frac{AK}{B} \sum_{i=1}^{N} \sigma_{m_i},$$

where A, K, and B are the number of bits in block 14, a parameter of the encoder (typically set K=1), and the number of bits available for encoding the frame 11, respectively.

Step 2: Check Threshold Condition

If the energy of the block with lowest energy among the non-discarded blocks is larger than the threshold value T in decision step 40, the process jumps to Step 3. Otherwise, the block skipping operation jumps to step 36, the latter lowest energy block is discarded in step 36, and the threshold value T is recomputed for the remaining nondiscarded blocks in step 38 as follows:

$$T = \frac{1}{12} \frac{AK}{B} \sum_{i=j+1}^{N} \sigma_{m_i}$$

then we set j=j+1 and go back to Step 2.

Step 3: End

When the energy of the lowest energy block is greater than the threshold value T (i.e., the energy intersects T), then no additional blocks 14 are discarded from the frame 11. The remaining blocks 15 (FIG. 5) are encoded in step 42 by block transform 16 (FIG. 5), such as with a DCT. Block quantizer 18 quantizes the transform coefficients before being coded as a $B_i$ bit stream by coder 20. After all the blocks 15 are encoded, step 44 gets the next frame 11 and returns to step 30.

Figure 6:
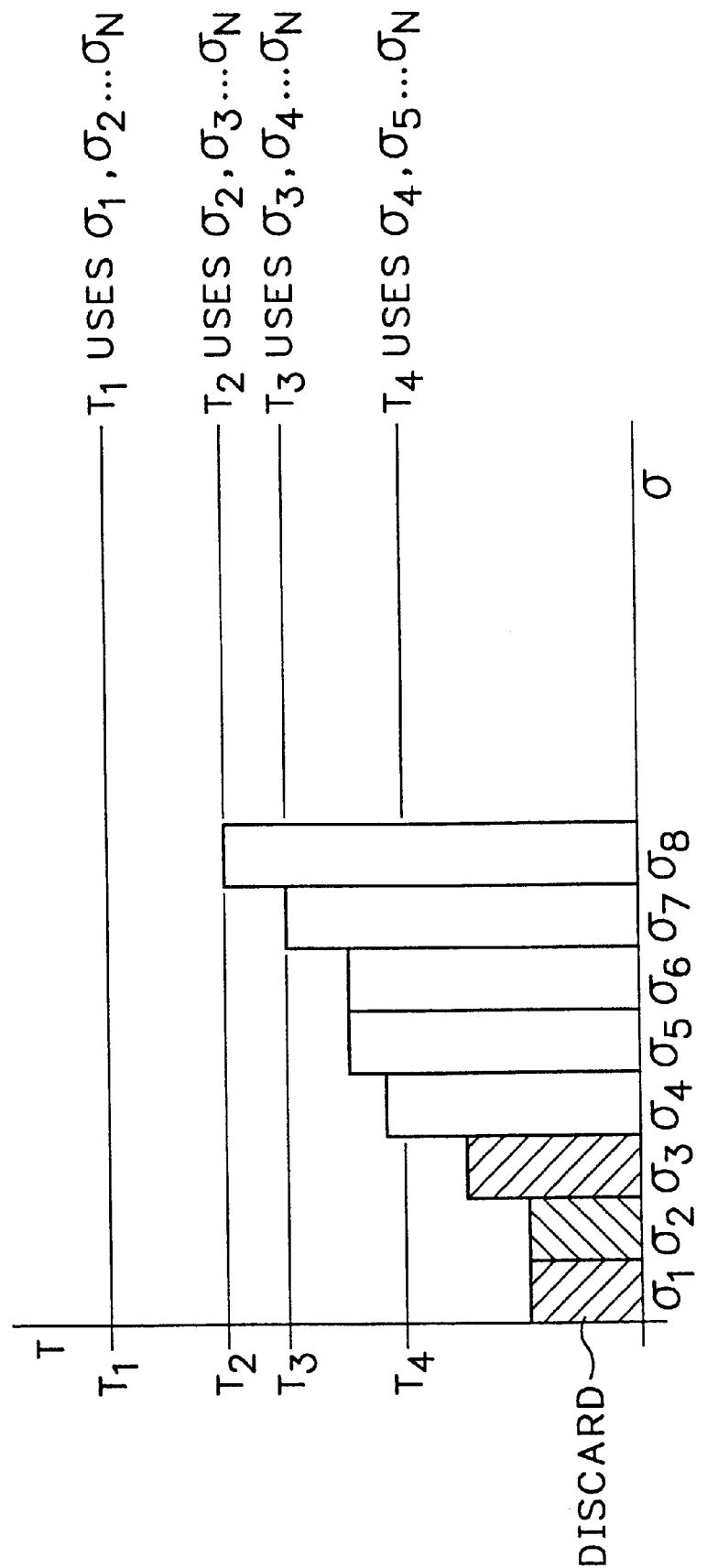
FIG. 6 is a graph showing how block skipping is performed.

Block skipping is shown graphically in FIG. 6. Assume, without loss of generality, that $\sigma_1 \leq \sigma_2 \leq \ldots \leq \sigma_N$. A first threshold value $T_1$ is generated using the standard deviations from blocks $\sigma_1, \sigma_2, \ldots, \sigma_N$. Since $\sigma_1$ is less than $T_1$, the block associated with $\sigma_1$ is discarded and the threshold recalculated ($T_2$) with $\sigma_2, \sigma_3, \ldots, \sigma_N$. In the example shown in FIG. 6, $\sigma_2$ is less than $T_2$ and so the next threshold $T_3$ is calculated using only $\sigma_3, \sigma_4, \ldots, \sigma_N$, and so on. Because $\sigma_4$ is greater than $T_4$, the threshold is set at $T_4$ and the three blocks with lowest standard deviations $\sigma_1, \sigma_2, \sigma_3$ are discarded and not encoded. Calculating bit allocation only with the remaining blocks increases the quality in the encoded image by not pre-allocating bits to blocks that will be discarded.

Low Complexity Implementation

For some real-time video codecs, the procedure above is too complex. In fact, many codecs decompose images into several hundred blocks before encoding. Hence, ordering these blocks 14 according to their standard deviation is computationally expensive. The following low-complexity implementation approximates the ranking step performed above. The key in this implementation is that block ordering is not needed, because a histogram of the block variances is generated during the computation of the standard deviations.

Step 1. Initialization

The standard deviations and the histogram for each block 14 are computed. Let $\Delta$ be the resolution of the histogram H(index).

Let i=1, S=0, and H(index)=0 for all index.
1. The standard deviation for i-th block $\sigma_i$ is computed as described above in equation 3.
2. The histogram index is computed for that $\sigma_i$:

$$index = \text{int}\left(\frac{\sigma_i}{\Delta}\right),$$

where int denotes integer part.

3. H(index)=H(index)+1
4. The energy for the block is added to the total, S=S+ index $\Delta \approx S + \sigma_i$.
5. Let i=i+1. If i>N, stop, otherwise go to 1.

Let j=1 and set the initial block skipping threshold to $$T = \frac{1}{12}\frac{AK}{B}S,$$

Step 2. Check Threshold Condition
  If (j$\Delta$<T)
   S=S−J$\Delta$H(index)

$$T = \frac{1}{12}\frac{AK}{B}S$$

go to Step 2
If not, go to Step 3 and keep the final value of T
Step 3. End

Figure 7:
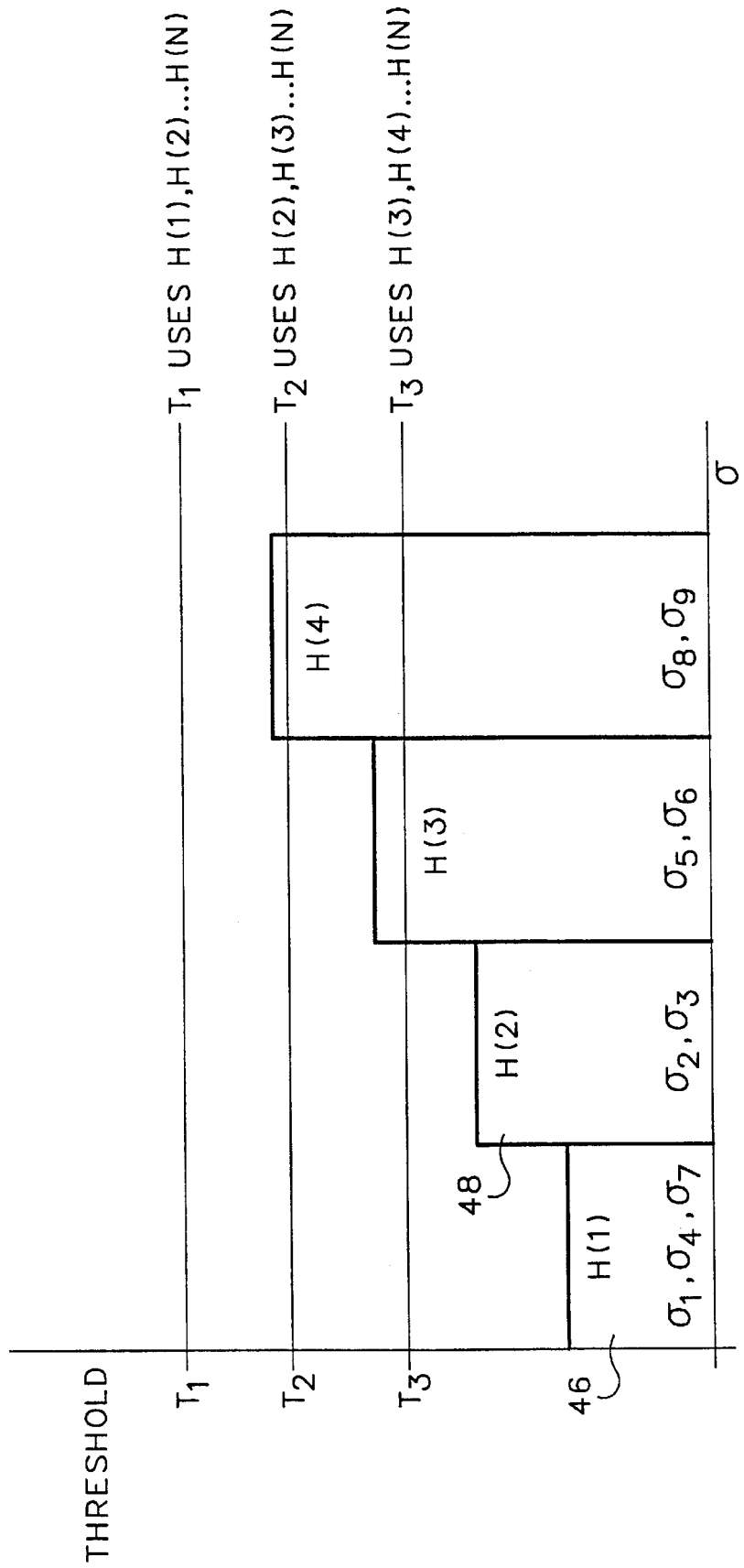
FIG. 7 is a graph showing how block skipping is performed using a low complexity technique.

The reduction technique is shown graphically in FIG. 7. The standard deviations for each block $\sigma_1, \sigma_2, \ldots, \sigma_N$ (ordered from smallest to largest) are placed in bins defined by the histogram resolution $\Delta$. All standard deviations within a first integer multiple of the histogram resolution $\Delta$ are placed in a first H(1) histogram bin 46. All standard deviations for a second integer multiple of $\Delta$ are assigned to a second H(2) histogram bin 48, etc. The first threshold value $T_1$ is calculated with the standard deviations accumulated for all blocks 14. If the first threshold value $T_1$ is greater than the energy associated with the first histogram bin 46, all blocks placed in bin H(1) are discarded. A second threshold value $T_2$ is then calculated minus the value of the energy values of the first histogram range H(1). The process continues until the threshold value T is less than the smallest remaining histogram value. All blocks having standard deviations in one of the discarded histogram bins are discarded prior to block encoding. In FIG. 7, all blocks having energies in histogram bins H(1) and H(2) are discarded.

Figure 8:
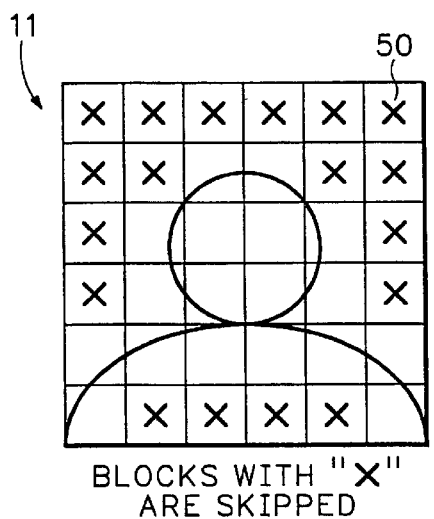
FIG. 8 is a diagram showing how block skipping tags blocks under an optimum energy threshold.

The value of T can be directly used by the block-layer rate control technique described in the co-pending patent application Ser. No. 09/008,137 so that all the blocks with standard deviations lower than T are skipped. To do this, the image blocks 14 to be skipped are tagged as shown with an "x" as shown in FIG. 8. The blocks 50 with energy lower than T are marked with "x" and are skipped during the subsequent encoding process. In video sequences, these blocks typically belong to regions that do not move between frames, e.g., the blocks in a static background. This can be implemented using a bit map that has one bit associated with each block in the frame 11. The bits in the bit map associated with the discarded blocks 50 are set to 1. When rate control is used, the tagged blocks are ignored and only the energy of the remaining blocks is taken into account for the bit allocation.

Frame Skipping

Figure 9:
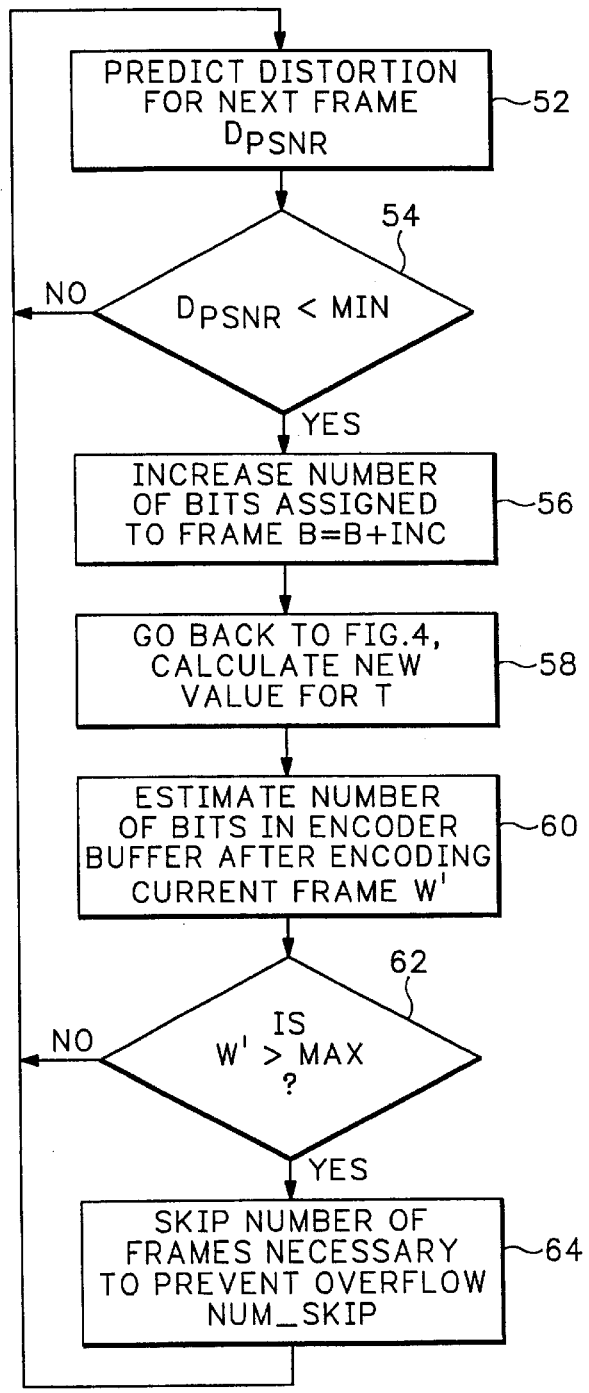
FIG. 9 is a step diagram showing how frame skipping is performed according to another aspect of the invention.

FIG. 9 shows how frame skipping is performed.
Step 1. Predict Distortion

The distortion or, equivalently, the image quality for the current frame $D_{PSNR}$ is predicted in step 52 using the equation (17) and (18) derived above:

$$D = \frac{1}{N}\sum_{\sigma_i \leq T}\sigma_i^2 + \frac{AK}{12N(B-ANC)}\left(\sum_{\sigma_i > T}\sigma_i\right)^2, \quad D_{PSNR} = 10\log\frac{255^2}{D},$$

where the parameters A, K, N, B, T, and $\{\sigma_i\}$ have already been defined, and C models the expected rate in bits per pixel for encoding the codec syntax information. The syntax rate C for many codecs (e.g., MPEG, H.263, etc.) can be approximated by a linear formula:

$$C = an(T) + b,$$

where n(T) is the number of blocks that will be skipped in the frame (i.e., those whose standard deviation is lower than T), and a and b are two constants that depend on the type of codec. For an MPEG-4 codec, the values a=−0.00036 and b=0.04 are used.

The value of D above is the approximate mean squared error in the encoded (compressed) frame with respect to the original (uncompressed) frame. $D_{PSNR}$ is the peak signal to noise ratio, which is a function of D. If an image is encoded with high quality, the distortion measure D is small and $D_{PSNR}$ is large.

Step 2. Increase Frame Target

If the image quality, in terms of $D_{PSNR}$, is less than a minimum preset value MIN in decision block 54, ($D_{PSNR}$<MIN), the number of bits is increased for the present frame in step 56, B=B+Inc. The encoder then goes back to Step 1 for "Block Skipping" to find the new value of T, since with the new frame target B, fewer blocks might be skipped.

A typical value of Inc is R/F, where R is the channel or target bit rate (in bits per second) and F is the frame rate of the video data (in frames per second). Any other value larger than zero could be used. For example, if the value B is determined in equation (17), the number of bits that would provide a good value of Inc is obtained:

$$Inc = ANC + \frac{AK}{12} \frac{\left(\sum_{\sigma_i \leq T} \sigma_i\right)^2}{\frac{255^2}{10^{MIN/10}} - \frac{1}{N}\sum_{\sigma_i > T} \sigma_i^2} - B, \quad (19)$$

which is the increase in bits needed to have $D_{PSNR}$=MIN. Equation (19) is obtained by combining equations (17) and (18), replacing B with Inc+B and $D_{PSNR}$ with MIN in the combined equation, and isolating Inc. In tests, a value of MIN=27 dB was used, but any other value could be selected directly by the user. The user can select and modify the value of MIN during the video communication by simply turning a knob. This process guarantees that all video frames encoded will have a $D_{PSNR}$ image quality larger than MIN.

Step 3. Skip Frame

The number of bits in the encoder buffer, W', is estimated in step 60 after encoding the current frame with B bits:

$$W' = \max(W + B - R/F, 0),$$

where W is the current number of bits in the buffer, B is the frame target and R/F is the number of bits accepted by the communication channel per frame interval.

The encoder skips encoding of as many frames as necessary to keep the number of bits in the buffer below some maximum, MAX, whose value depends on the buffer size. For example, if the buffer size is 20,000 bits, MAX is typically chosen to be a value between 16,000 and 18,000 bits, which corresponds to 80–90 per cent of the buffer size. If decision step 62 determines that the number of bits in the encoder buffer is greater than MAX, the number of frames to skip, Num_skip, in order to keep the buffer level below MAX is determined in step 64 as follows:

If W'>MAX $$\text{Num\_skip} = \left\lceil \frac{W' - MAX}{R/F} \right\rceil \quad (20)$$

Otherwise Num_skip=0.

In equation (20), the operation ⌈a⌉ consists of rounding a to the closest integer larger than a. Even before the current frame is encoded, the encoder knows that "Num_skip" frames will be skipped after the current frame to prevent buffer overflow. This information is useful since, the encoder may decide to slow down the encoding process for the current frame and maybe spend more time optimizing the bit allocation.

Figure 10:
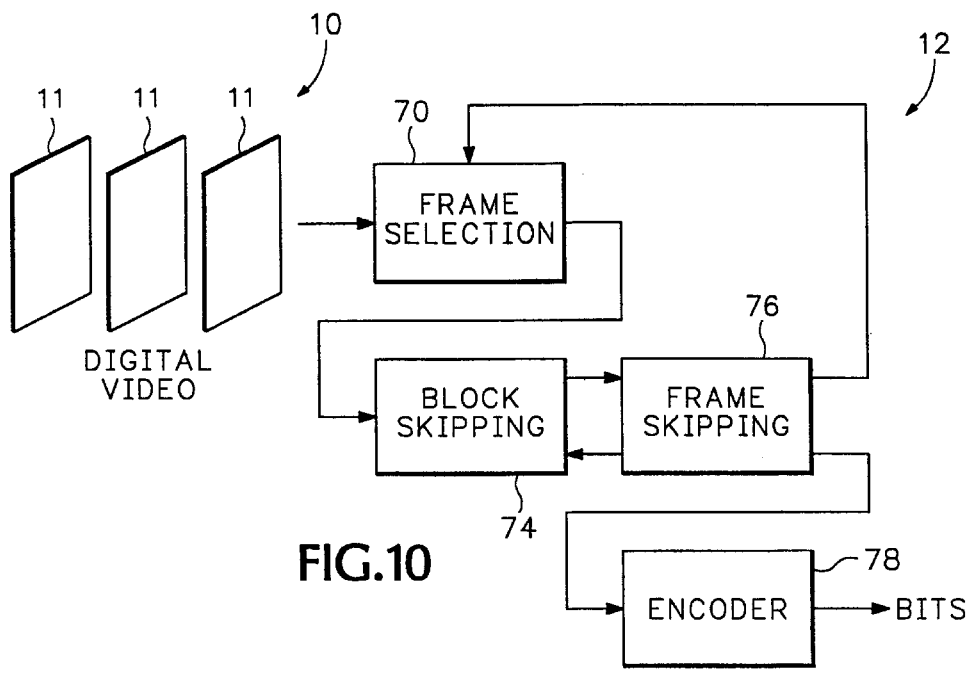
FIG. 10 is a block diagram showing an encoder using both block and frame skipping.

FIG. 10 shows the encoder 12 that incorporates both the block skipping shown in FIG. 4 and the frame skipping shown in FIG. 9. Digital video frames 11 are selected in frame selection 70. Block skipping 74 determines how many blocks in the current frame should be skipped to minimize image distortion. Frame skipping in block 76 allots more bits to frames having a $D_{PSNR}$ quality below a preset quality (or distortion) threshold. If the current frame is below the distortion threshold and allotted more bits, the current frame is sent back to block skipping 74. The energy threshold is recalculated according to the new bit allotment. Frame skipping 76 then determines the number of subsequent frames that need to be skipped based on the new bit allotment for the current frame. The number of frames to be skipped is indicated to the frame selection 70. Accordingly, a number of blocks 14 in each frame 11 and a number of frames 11 in the sequence of frames 10 are skipped before any encoding is performed in encoder 78.

The block and frame skipping scheme was used to encode frames of real video sequences using an MPEG4 video codec (version VM 7.0). The video sequences, format, frame rate in frames per second (fps), and bit rate in Kilobits per second (Kbps) are described in the table shown in FIG. 11. Each video sequence had 300 frames. In FIG. 11, the increase in image quality is shown when the block skipping procedure is used in conjunction with the rate control defined in co-pending application Ser. No. 09/008,137. Quality improvements of up to 3.4 dB are achieved. Knowing which blocks will be skipped, increases image quality by allowing a more effective bit allocation.

Additionally, FIG. 11 indicates the (approximate) percentage of blocks that are skipped per frame, which translates directly into savings on computation since those blocks are not DCT transformed and quantized. This technique can save up to about 90% of processing required for performing the DCT/quantization operations.

The frame skipping technique guarantees a minimum PSNR quality per video frame, even throughout scene changes. Frames are skipped to maintain the image quality and not as a reaction to a panic situation, like when a buffer is close to overflow.

Figure 12:
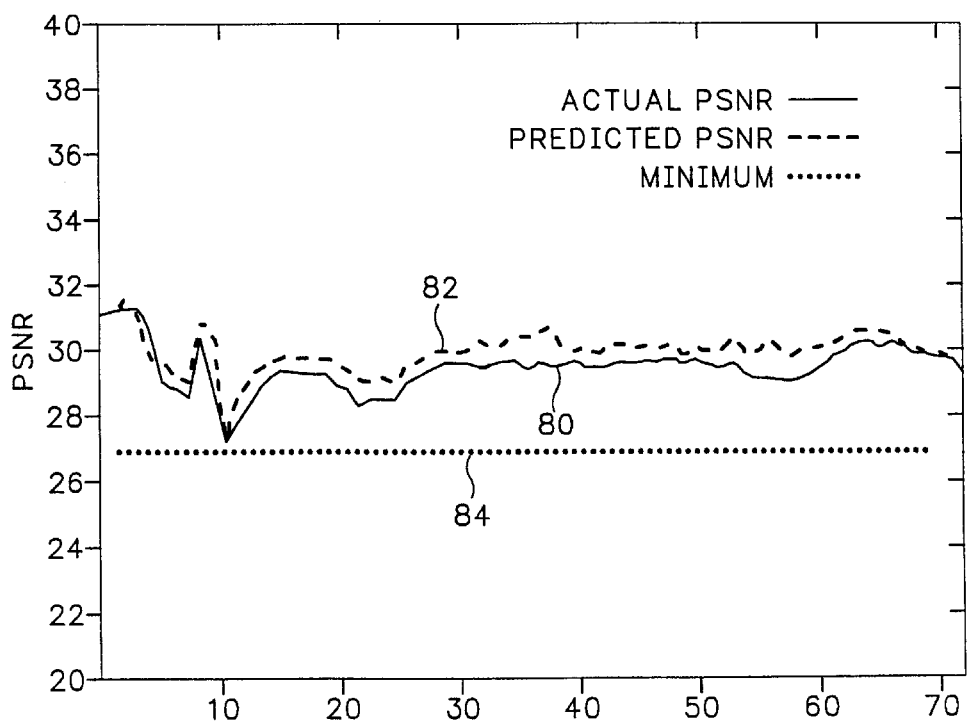
FIG. 12 is a graph showing the results of block skipping.

Results of the frame skipping mechanism (combined with block skipping) when encoding "Hall" at 10 Kbps and 10 frames per second (fps) is shown in FIG. 12. In FIG. 12, a solid line 80 indicates the PSNR of the coded frames in the well-known video sequence "Hall", at 10 Kbps and 7.5 fps. A dashed line 82 is a prediction for the PSNR using the technique in equations (17) and (18). Block skipping prediction is very close to the actual PSNR, typically within 0.5 dB. A dotted line 84 is the minimum PSNR, which is set to MIN=27 dB. The PSNR of the sequence is maintained above the minimum.

Between frames 10 and 20 there is a significant change of image data, since a person that occupies a large percentage of the frame size suddenly appears in the scene. This phenomenon would not be detectable with prior art methods, because those methods detect only scene changes. Block and frame skipping predicts the drop in quality and skips several frames to maintain the PSNR above 27 dB. Without frame skipping, the image quality would have dropped close to 24 dB.

Variations of the block and frame skipping technique are described below, which are also based on a single-pass encoding framework. If the computation of the $\sigma_k$'s used for finding S cannot be done in advance, a good estimate for the total energy in the frame S is used such as the value of S from the previous video frame.

In order to further reduce the computational complexity, the formula for the standard deviation in equation (5) is replaced by $$\sigma_i = \frac{1}{A}\sum_{j=1}^{A} \text{abs}(P_i(j) - \overline{P}_i),$$

where abs(x) is the absolute value of x. In video coding, the mean value of pixels in inter blocks is usually zero and hence this formula may be simplified by setting $\overline{P}_i$=0.

All or any subset of the techniques above can be combined and used together. The systems for block and frame skipping can be incorporated as a middle layer between the classical frame and block (or macroblock) layers in video codecs as shown in FIG. 10. Block skipping can be done before frame skipping to improve the prediction of the encoding quality and hence both methods complement each other, but these techniques can also be used separately and with any rate control technique.

The theory underlying the derivation of the techniques disclosed here is also used in the frame-layer and block-layer techniques disclosed in the co-pending patent application Ser. No. 09/008,137. Several of the parameters described here are also used in the other methods disclosed in this co-pending application and hence a combination of all the methods would further reduce encoding computational complexity.

Block and frame skipping can be used for encoding digital images and video in low-delay communications (e.g., video phone, video conferencing, broadcast, etc.), especially through low bit rate communication channels (e.g., PSTN, ISDN, mobile channels, etc.) The invention can also be used with any video encoder, including those compliant with the standards MPEG 1-2-4, H.261, H.263 and H.263+.

Having described and illustrated the principles of the invention in a preferred embodiment thereof, it should be apparent that the invention can be modified in arrangement and detail without departing from such principles. I claim all modifications and variations coming with the spirit and scope of the following claims.

We claim:

1. A method for encoding images, comprising:

decomposing images into multiple image subsections;

deriving the energy for the individual image subsections;

dynamically deriving an energy threshold individually adapted to every image according to the energy of the image subsections, a number of bits available for encoding the image, and a coding efficiency of an image encoder; and selecting image subsections in each image for encoding according to the individually adapted energy threshold; and encoding the selected image subsections for each image while discarding nonselected image subsections.

2. A method according to claim 1 wherein deriving the energy thresholds for each image includes repeatedly discarding one or more of the multiple image subsections with a lowest energy and computing another threshold using only the remaining nondiscarded image subsections until one or more of the remaining lowest energy image subsections is greater than the computed energy threshold.

3. A method according to claim 1 wherein the energy threshold is derived according to a total energy for all the selected nondiscarded image subsections and a number of bits available for encoding the selected nondiscarded image subsections.

4. A method according to claim 3 wherein the energy threshold is derived according to the following:

$$T = \frac{1}{12} \frac{AK}{B} \sum_{m=M+1}^{N} \sigma_{m_i},$$

where A is a number of pixels in each image subsection, K is a constant parameter, B is a number of bits available for encoding the image, $\sigma_{K_i}$ is a standard deviation of pixels values in image subsections and M is the number of discarded image subsections.

5. A method according to claim 1 including ranking the image subsections according to the amount of energy and discarding the image subsections starting with one of the image subsections with a lowest energy.

6. A method according to claim 1 including:

computing a standard deviation $\sigma_i$ for each one of the image subsections;

computing histogram indices for the standard deviations $\sigma_i$;

calculating the energy threshold for all image subsections;

discarding all image subsections with a smallest histogram index when the energy associated to the lowest histogram index is less than the energy threshold; and repeatedly recalculating the energy threshold only with the nondiscarded image subsections and discarding all image subsections in the lowest nondiscarded histogram index until the energy associated to the lowest nondiscarded histogram index is greater than the energy threshold.

7. A method according to claim 1 including:

decomposing multiple frames of the image into multiple blocks;

allotting a given bit rate for encoding the multiple frames;

predicting a distortion or quality value for each one of the frames which depends on the energy thresholds adapted to the respective frames;

setting a minimum frame quality value; and allotting more bits to frames that have a predicted quality values lower than the minimum frame quality value and discarding other frames until the quality of the nondiscarded frames is above the minimum frame quality value.

8. A method according to claim 7 including: predicting the distortion value for each frame according to the following:

$$D_{PSNR} = 10 \log_{10} \frac{255^2}{D}, \text{ with } D = \frac{1}{N} \sum_{\sigma_i \leq T} \sigma_i^2 + \frac{AK}{12N(B-ANC)} \left( \sum_{\sigma_i > T} \sigma_i \right)^2,$$

where A is a number of pixels in each block, K and C are constant parameters of the encoder, B is the number of bits for the bit rate available for encoding the image, $\sigma_i$ is a standard deviation of pixels values for block i, T is the energy threshold, and N is the number of blocks in the frame.

9. A method according to claim 7 including:

allotting an increased number of bits B=B+Inc for the frames having quality values smaller than the minimum frame quality value where $$Inc = ANC + \frac{AK}{12} \frac{\left( \sum_{\sigma_i > T} \sigma_i \right)^2}{\frac{255^2}{10^{MIN/10}} - \frac{1}{N} \sum_{\sigma_i > T} \sigma_i^2} - B,$$

and MIN is a user selectable minimum frame quality value.

10. A method according to claim 7 including the following:

estimating a number of bits in an encoder buffer W' after encoding a current frame according to the current number of bits in the buffer, the target number of bits for encoding the current frame and the number of bits accepted by the communication channel per frame interval; and, skipping a number of frames when the estimated number of bits is greater than a preselected bit overflow threshold number for the buffer.

11. A method according to claim 1 including the following:
calculating the energy for the individual image subsections as a standard deviation for the pixels in each image derived according to a number of pixels in the image subsection, pixel values in the ith image subsection and an average of the pixel values in the image subsection.

12. A method according to claim 11 including deriving the standard deviations of the pixel values from a previous image frame.

13. A method according to claim 11 including estimating the standard deviation for each image subsection according to the absolute value of the pixel values in the image subsection and the average pixel value in the image subsection.

14. A method according to claim 11 including simplifying the energy calculation for the image subsections by setting the average pixel value to zero.

15. An image encoder, comprising:
a computing system configured to decompose images into multiple image subsections and derive the energy for the individual image subsections;
the computing system configured to derive energy thresholds adapted to the individual images according to the energy of the image subsections and a number of bits available for encoding the image; and
the computing system further configured to select image subsections in each image for encoding according to the individually adapted energy threshold while discarding nonselected image subsections.

16. The image encoder of claim 15 wherein the computing system is configured to derive the energy thresholds for the images by repeatedly discarding one or more of the multiple image subsections with a lowest energy and computing another threshold using only the remaining nondiscarded image subsections until one or more of the remaining lowest energy image subsections is greater than the computed energy threshold.

17. The image encoder of claim 15 wherein the computing system is configured to derive the energy thresholds according to a total energy for all the selected nondiscarded image subsections and a number of bits available for encoding the selected nondiscarded image subsections.

18. The image encoder of claim 15 wherein the computing system is configured to derive the energy thresholds according to the following:

$$T = \frac{1}{12} \frac{AK}{B} \sum_{m=M+1}^{N} \sigma_{m_i},$$

where A is a number of pixels in each image subsection, K is a constant parameter, B is a number of bits available for encoding the image, $\sigma_{K_i}$ is a standard deviation of pixels values in image subsections and M is the number of discarded image subsections.

19. The image encoder according to claim 15 wherein the computing system is configured to rank the image subsections according to the amount of energy and discarding the image subsections starting with one of the image subsections with a lowest energy.

20. The image encoder according to claim 15 wherein the computing system is configured to:

compute a standard deviation $\sigma_i$ for each one of the image subsections;
compute histogram indices for the standard deviations $\sigma_i$;
calculate the energy threshold for all image subsections;
discard all image subsections with a smallest histogram index when the energy associated to the lowest histogram index is less than the energy threshold; and
repeatedly recalculate the energy threshold with the nondiscarded image subsections and discards image subsections in the lowest nondiscarded histogram index until the energy associated to the lowest nondiscarded histogram index is greater than the energy threshold.

21. The image encoder according to claim 15 wherein the computing system is configured to:
decompose multiple frames of the image into multiple blocks;
allot a given bit rate for encoding the multiple frames;
predict a distortion or quality value for the frames which depends on the energy thresholds adapted to the respective frames;
set a minimum frame quality value; and
allot more bits to frames that have a predicted quality values lower than the minimum frame quality value and discard other frames until the quality of the nondiscarded frames is above the minimum frame quality value.

22. The image encoder according to claim 21 wherein the computing system is configured to predict the distortion value for each frame according to the following:

$$D_{PSNR} = 10\log_{10}\frac{255^2}{D}, \text{ with } D = \frac{1}{N}\sum_{\sigma_i \leq T}\sigma_i^2 + \frac{AK}{12N(B-ANC)}\left(\sum_{\sigma_i > T}\sigma_i\right)^2,$$

where A is a number of pixels in each block, K and C are constant parameters of the encoder, B is the number of bits for the bit rate available for encoding the image, $\sigma_i$ is a standard deviation of pixels values for block i, T is the energy threshold, and N is the number of blocks in the frame.

23. The image encoder according to claim 21 wherein the computing system is configured to allot an increased number of bits B=B+Inc for the frames having quality values smaller than the minimum frame quality value where $$Inc = ANC + \frac{AK}{12}\frac{\left(\sum_{\sigma_i > T}\sigma_i\right)^2}{\frac{255^2}{10^{MIN/10}} - \frac{1}{N}\sum_{\sigma_i > T}\sigma_i^2} - B,$$

and MIN is a user selectable minimum frame quality value.

24. The image encoder according to claim 21 wherein the computing system is configured to estimate a number of bits in an encoder buffer W' after encoding a current frame according to the current number of bits in the buffer, the target number of bits for encoding the current frame and the number of bits accepted by the communication channel per frame interval; and skip a number of frames when the estimated number of bits is greater than a preselected bit overflow threshold number for the buffer.

25. The image encoder according to claim 15 wherein the computing system is configured to calculate the energy for the individual image subsections as a standard deviation for the pixels in each image derived according to a number of pixels in the image subsection, pixel values in the image subsection and an average of the pixel values in the image subsection.

26. The image encoder according to claim 25 wherein the computing system is configured to derive the standard deviations of the pixel values from a previous image frame.

27. The image encoder according to claim 25 wherein the computing system is configured to estimate the standard deviation for each image subsection according to the absolute value of the pixel values in the image subsection and the average pixel value in the image subsection.

28. The image encoder according to claim 25 wherein the computing system is configured to simplify the energy calculation for the image subsections by setting the average pixel value to zero.

* * * * *

UNITED STATES PATENT AND TRADEMARK OFFICE
CERTIFICATE OF CORRECTION

PATENT NO.       : 6,560,370 B2
APPLICATION NO.  : 10/066369
DATED            : May 6, 2003
INVENTOR(S)      : Ribas-Corbera et al.

It is certified that error appears in the above-identified patent and that said Letters Patent is hereby corrected as shown below:

- Col. 6 line 10;  $B = \sum_{i=1}^{N} A\left(K\frac{\sigma_i^2}{Q_i^2} + C\right) H(Q_i - \sqrt{12}\sigma_i)$, should read subject to $B = \sum_{i=1}^{N} A\left(K\frac{\sigma_i^2}{Q_i^2} + C\right) H(Q_i - \sqrt{12}\sigma_i)$.

- Col. 6, line 21;  $\hat{Q}_1, \hat{Q}_2, \hat{Q}_N$, should read $\hat{Q}_1, \hat{Q}_2, \cdots, \hat{Q}_N$,

- Col. 6, line 30;  $D' = \min_{Q_1,\ldots,Q_N} \frac{1}{N}\sum_{i=1}^{N}$ $D_i = \min_{Q_1,\ldots,Q_N} \frac{1}{N}\sum_{i=1}^{N}\frac{Q_i^2}{12}$, should read; $D' = \min_{Q_1,\ldots,Q_N} \frac{1}{N}\sum_{i=1}^{N} D_i = \min_{Q_1,\ldots,Q_N} \frac{1}{N}\sum_{i=1}^{N}\frac{Q_i^2}{12}$,

- Col. 9, line 60 " $T = \frac{1}{12}\frac{AK}{B}S$ go to step 2 ", should read $T = \frac{1}{12}\frac{AK}{B}S$ j= j+1
go to Step 2

Signed and Sealed this

Fourteenth Day of November, 2006

JON W. DUDAS
*Director of the United States Patent and Trademark Office*